(12) United States Patent
Jarrossay et al.

(10) Patent No.: US 12,209,503 B2
(45) Date of Patent: Jan. 28, 2025

(54) TURBINE RING ASSEMBLY FOR A TURBOMACHINE

(71) Applicant: SAFRAN AIRCRAFT ENGINES, Paris (FR)

(72) Inventors: Clément Jarrossay, Moissy-Cramayel (FR); Aurélien Gaillard, Moissy-Cramayel (FR); Pascal Cédric Tabarin, Moissy-Cramayel (FR); Arthur Paul Gabriel Nimhauser, Moissy-Cramayel (FR); Clément Emile André Cazin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/552,716

(22) PCT Filed: Mar. 25, 2022

(86) PCT No.: PCT/FR2022/050563
§ 371 (c)(1),
(2) Date: Sep. 27, 2023

(87) PCT Pub. No.: WO2022/208007
PCT Pub. Date: Oct. 6, 2022

(65) Prior Publication Data
US 2024/0068376 A1 Feb. 29, 2024

(30) Foreign Application Priority Data

Mar. 30, 2021 (FR) ........................................ 2103253

(51) Int. Cl.
*F01D 11/24* (2006.01)
*F01D 25/24* (2006.01)

(52) U.S. Cl.
CPC ............ *F01D 11/24* (2013.01); *F01D 25/246* (2013.01); *F05D 2220/323* (2013.01); *F05D 2240/11* (2013.01); *F05D 2300/6033* (2013.01)

(58) Field of Classification Search
CPC ................................. F01D 11/24; F01D 11/08
See application file for complete search history.

(56) References Cited

U.S. PATENT DOCUMENTS

| 7,611,324 | B2 * | 11/2009 | Lee | .......................... | F01D 11/08 |
| | | | | | 415/173.1 |
| 10,184,352 | B2 * | 1/2019 | O'Leary | .................. | F01D 11/08 |

(Continued)

FOREIGN PATENT DOCUMENTS

| EP | 3 115 559 A1 | 1/2017 |
| EP | 3 173 583 A1 | 5/2017 |

(Continued)

OTHER PUBLICATIONS

International Search Report mailed May 16, 2022, issued in corresponding International Application No. PCT/FR2022/050563, filed Mar. 25, 2022, 6 pages.

(Continued)

*Primary Examiner* — Michael L Sehn
(74) *Attorney, Agent, or Firm* — CHRISTENSEN O'CONNOR JOHNSON KINDNESS PLLC

(57) ABSTRACT

A turbine ring assembly having ring segments made of ceramic matrix composite material and each having first and second attachment tabs and a cavity for the circulation of air flow, a metal support having a first bracket and a second bracket bearing axially upstream against the second tab, a first metal flange arranged upstream of the first bracket and having an inner periphery bearing axially downstream against the first tab and an outer periphery fastened to the first bracket, and air passage orifices formed in the inner periphery of the first flange and/or in the second bracket, the (Continued)

orifices configured to ensure that the air flow passes from the cavity to the outside of the assembly.

12 Claims, 8 Drawing Sheets

(56) References Cited

U.S. PATENT DOCUMENTS

| | | | |
|---|---|---|---|
| 11,174,747 B2 * | 11/2021 | Roy Thill | ............... F01D 11/08 |
| 2018/0051591 A1 | 2/2018 | Quennehen et al. | |
| 2018/0073391 A1 | 3/2018 | Jennings | |

FOREIGN PATENT DOCUMENTS

| | | |
|---|---|---|
| EP | 3 865 682 A1 | 8/2021 |
| FR | 3 056 632 A1 | 3/2018 |

OTHER PUBLICATIONS

Written Opinion mailed May 16, 2022, issued in corresponding International Application No. PCT/FR2022/050563, filed Mar. 25, 2022, 7 pages.

\* cited by examiner

TURBINE RING ASSEMBLY FOR A TURBOMACHINE

CROSS-REFERENCE TO RELATED APPLICATIONS

This application is a National Stage of International Application No. PCT/FR2022/050563, filed Mar. 25, 2022, which claims priority to French Patent Application No. 2103253, filed Mar. 30, 2021, the entire disclosures of which are hereby incorporated by reference in their entirety for all purposes.

TECHNICAL FIELD OF THE INVENTION

The invention relates to the technical field of the turbomachines, in particular, for aircrafts. More particularly, the invention relates to a turbine ring assembly for a turbomachine which comprises a plurality of ring sectors of ceramic matrix composite material as well as an annular metallic support of a turbine ring.

TECHNICAL BACKGROUND

The prior art comprises, in particular, the documents EP-A1-3865682; FR-A1-3056632, EP-A1-3173583, US-A1-2018/051591, EP-A1-3115559 and US-A1-2018/073391.

Generally speaking, a turbomachine, particularly for an aircraft, comprises, from upstream to downstream, a fan, a low-pressure compressor, a high-pressure compressor, a combustion chamber, a high-pressure turbine and a low-pressure turbine.

A high-pressure turbine of the turbomachine comprises at least one stage comprising a turbine stator formed by an annular row of stationary straightening vanes and an impeller rotatably mounted downstream of the turbine stator in a cylindrical or frustoconical assembly of ring sectors arranged circumferentially end-to-end and forming a turbine ring. In the case of all-metal turbine ring assemblies, it is necessary to cool all the elements of the ring assembly and in particular the turbine ring, which is subjected to the hottest flows. This cooling has a significant impact on engine performance, since the cooling flow used is collected from the main flow of the engine. In addition, the use of metal for the turbine ring limits the possibility of increasing the temperature at the level of the turbine, which would allow to improve the performance of the aero-engines.

In an attempt to solve these problems, it was decided to make the turbine ring sectors from a ceramic matrix composite (CMC) material and to do away with the need to use a metallic material.

The CMC materials have good mechanical properties, making them suitable for use as structural elements, and they retain these properties at elevated temperatures. The use of CMC materials permits reduced cooling flow required during operation, thereby increasing the performance of the turbomachines. In addition, the use of CMC materials has the advantage of reducing the weight of the turbomachines and reducing the effect of hot expansion encountered with the metal parts. Each sector of the turbine ring, made of CMC material, is assembled with attachment elements made of metallic material of an annular support of the turbine ring and of the ring assembly, and these metal attachment elements are also subjected to the hot flow. As a result, by reducing the operating cooling flow of the turbine ring, the metal attachment elements in contact with the turbine ring are more exposed to the hot flow. In this case, it is the metal attachment elements that are subjected to significant mechanical stresses.

Thus, there is a need to improve the existing turbine ring assemblies using ring sectors made of CMC material, in particular, by reducing the mechanical stresses to which the metal parts in contact with the CMC ring sectors are subjected during the turbine operation.

SUMMARY OF THE INVENTION

To this end, the invention proposes a turbine ring assembly for a turbomachine of an aircraft, the ring assembly extending about an axis A and comprising:
 ring sectors of ceramic matrix composite material forming a turbine ring, each ring sector comprising first and second attachment tabs extending radially outwards from, respectively, upstream and downstream ends of the ring sectors, these first and second tabs defining between them a cavity for circulating a flow of cooling air F,
 an annular metal support for a turbine ring comprising first and second annular flanges, upstream and downstream respectively, extending radially inwards and configured to hold the first and second attachment tabs of each ring sector, said second flange being in axial abutment toward upstream against the second attachment tab, relative to the orientation of a gas flow G intended to pass through the ring assembly along said axis A, and
 a first annular metal shroud arranged upstream of the turbine ring and of the first flange, said first shroud comprising an inner periphery in axial abutment toward downstream against the first attachment tab and an outer periphery attached to the first flange.

According to the invention, the ring assembly further comprises air passage orifices formed in the inner periphery of the first shroud and/or in the second flange, these air passage orifices being configured to provide an air outlet from said cavity.

Such a configuration effectively allows to cool the metal elements of the ring assembly that are exposed to the hot flow. The cooling system according to the invention integrates orifices in the inner periphery of the first shroud and/or in the second flange. More specifically, the cooling air circulation cavity of each ring sector is supplied with a flow of air, referred to as ventilation and cooling air, which comes from a compressor of the turbomachine upstream of the ring assembly. This flow of air is evacuated from the cavity of each of the ring sectors preferably through the orifices of the first shroud and/or of the second flange, absorbing the heat and thus cooling these metal elements of the ring assembly. This allows to increase the performance of the turbomachine, since the air flow collected upstream of the ring assembly allows both the CMC turbine ring and the first metal shroud and/or the second metal flange to be cooled with a minimum flow rate.

The invention therefore has the advantage of proposing a simple, highly reliable design with low cost and overall dimensions for the ring assembly in a turbomachine.

The turbine ring assembly according to the invention may comprise one or more of the following characteristics, taken in isolation from each other or in combination with each other:
 the orifices of the first shroud are oriented radially outwards from upstream to downstream, and/or the orifices of the second flange are oriented radially inwards from upstream to downstream;

the orifices of the first shroud are also preferably oriented in a circumferential direction (with respect to the axis A);

the orifices of the second flange are also preferably oriented in a circumferential direction (with respect to the axis A);

the inner periphery of the first shroud comprises a radial annular face for abutting on the first attachment tab, and in that the orifices formed on this shroud open downstream radially to the outside of this face;

the second flange comprises an inner periphery having a radial annular face for abutting on the second attachment tab, and in that the orifices formed on this second flange open upstream radially to the outside of this face;

the air passage orifices are regularly spaced around said axis A;

the air passage orifices are grouped together in series of orifices, the circumferential pitch around said axis A between the orifices in the same series of orifices being less than the circumferential pitch around said axis A between two consecutive series of orifices;

each series of orifices comprises between three and ten orifices;

the orifices are circular and/or oblong;

the air passage orifices are formed in the first shroud and in the second flange;

the second flange comprises a first portion, a second portion, and a third portion comprised between the first and second portions, the second and third portions being separated by a shoulder, wherein the orifices formed on the second flange open upstream and into the shoulder.

The present invention also relates to a turbine for a turbomachine of an aircraft, comprising at least one turbine stator formed by an annular row of stationary straightening vanes and an impeller mounted so as to rotate downstream of the turbine stator and inside the turbine ring of a ring assembly according to one of the particularities of the invention.

Each series of orifices formed on the first shroud can be located between two trailing edges of two consecutive stationary vanes upstream of the turbine ring, and/or each series of orifices formed on the second flange of the annular support can be located between two leading edges of two consecutive stationary vanes downstream of the turbine ring.

The present invention also relates to a turbomachine, in particular, for an aircraft, comprising at least one turbine ring sector assembly according to one of the particularities of the invention, or a turbine according to the invention.

BRIEF DESCRIPTION OF THE FIGURES

Further characteristics and advantages will be apparent from the following description of a non-limiting embodiment of the invention with reference to the appended drawings in which:

FIG. 6b is a schematic perspective view of the upstream side of the second downstream flange of FIG. 6a;

FIG. 8b is a schematic perspective view of the downstream side of the second downstream flange in FIGS. 7b and 8a;

FIG. 9a is a schematic perspective view of the upstream side of the first shroud in FIG. 7a;

FIG. 9b is a schematic perspective view of the downstream side of the first shroud in FIGS. 7a and 9a.

DETAILED DESCRIPTION OF THE INVENTION

Generally speaking, in this application, the terms "longitudinal" and "axial" refer to the orientation of structural elements extending in the direction of a longitudinal axis. This longitudinal axis can be coincident with the axis of rotation of an engine of a turbomachine. The term "radial" refers to an orientation of structural elements extending in a direction perpendicular to the longitudinal axis. The terms "inner" and "outer", and "internal" and "external" are used in reference to a positioning with respect to the longitudinal axis. Thus, a structural element extending along the longitudinal axis comprises an inner face facing the longitudinal axis and an outer surface opposite its inner surface. By convention, in this application, the terms "upstream" and "downstream" are defined in relation to the orientation of circulation of a gas flow in the turbomachine.

A turbomachine typically comprises, from upstream to downstream, a fan, a low-pressure compressor, a high-pressure compressor, a combustion chamber, a high-pressure turbine and a low-pressure turbine.

Figure 1:
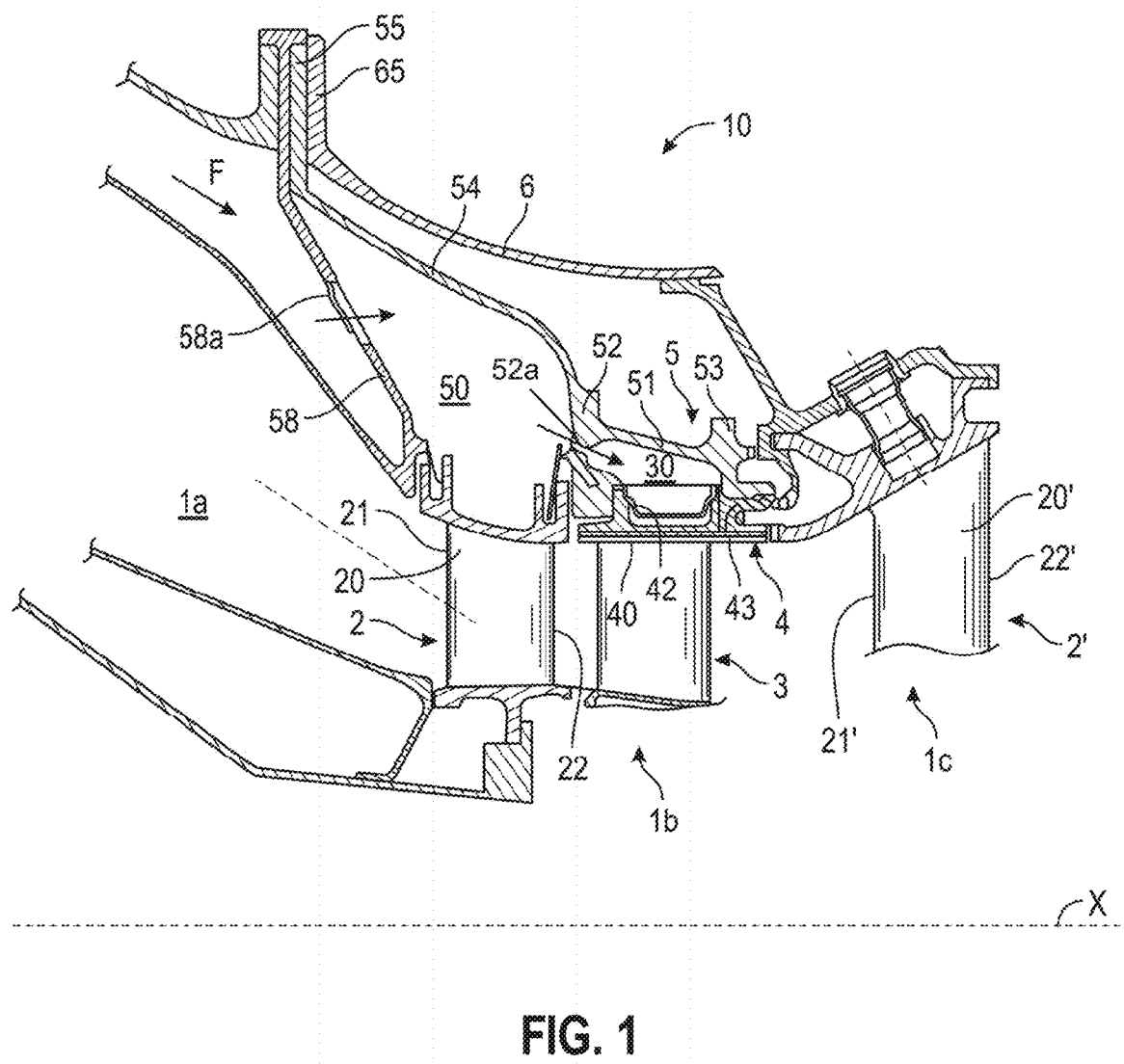
FIG. 1 is a partial schematic half-view in axial cross-section of a high-pressure turbine of a turbomachine according to the prior art.

More specifically, FIG. 1 illustrates part of a turbomachine 10 extending along a longitudinal axis X and comprising, from upstream to downstream, a combustion chamber 1a, a high-pressure (HP) turbine 1b and a low-pressure (LP) turbine 1c. Each stage of one of the turbines 1b, 1c comprises an annular row of guide or stationary straightening vanes 20, 20' and an impeller 3 arranged alternately in a known manner. The annular row of stationary vanes 20 of the HP turbine 1b forms a turbine stator 2. The impeller 3 (or rotor) is rotatably mounted downstream of the turbine stator 2 in an assembly 1 which is cylindrical or frustoconical in accordance with a prior art configuration.

The assembly 1 comprises a plurality of ring sectors 40 arranged circumferentially end to end and forming a turbine ring 4 enveloping the impeller 3. The turbine ring 4 is suspended from a turbine casing 6 by means of an annular support 5. This annular support 5 of the assembly 1 comprises at its inner periphery a first and a second annular radial flange 52, 53, upstream and downstream respectively, which are connected to each other by a cylindrical portion 51.

The annular support 5 also comprises a frustoconical (FIG. 1) or annular (FIG. 2) portion 54 extending upstream and outwards relative to the axis X. This portion 54 is, on the one hand, connected at its radially inner end to the cylindrical portion 51, and on the other hand, connected at its radially outer end to a radially outer annular flange 55 for attaching to a corresponding annular flange 65 of the turbine casing 6. The portion 54 of the annular support 5 defines an annular enclosure 50 with a frustoconical wall 58 of 10 the chamber 1a. The enclosure 50 is supplied with ventilation and cooling air through piercings 58a in the frustoconical wall 58. Piercings 52a are formed in the first flange 52 of the annular support 5 to establish a fluidic communication between the enclosure 50 and a cooling air circulation cavity 30 of each ring sector 40. This cavity 30 is delimited externally by the wall 51 of the annular support. The arrow F indicates the flowing orientation of a flow of cooling air coming in particular from the compressor (non-illustrated) of the turbomachine 10 which supplies the combustion chamber 1a with air.

At their upstream and downstream ends, the ring sectors 4 comprise first and second attachment tabs 42, 43 for attaching onto, respectively, the first and second flanges 52, 53 of the annular support 5.

The assembly 1 of the turbine ring is described in more detail with reference to FIG. 2, which shows it in half-view in radial cross-section according to another configuration of the prior art. The assembly 1 of the turbine ring of FIG. 2 can be assembled in the turbomachine 10 of FIG. 1.

The assembly 1 of the turbine ring therefore extends around a longitudinal axis A. This axis A is substantially parallel to the axis X of the turbomachine 10. The arrow DA indicates the axial direction of the turbine ring 4 while the arrow DR indicates the radial direction of the turbine ring 4. To simplify presentation, FIG. 2 is a partial view of the turbine ring 4, which is in fact a complete ring. The arrow G indicates the flowing orientation of a gaseous flow in the turbine 1 b.

Each ring sector 40 has, in a plane defined by the axial direction DA and the radial direction DR, a cross-section substantially in the shape of the inverted Greek letter "Pi" (π). The cross-section comprises an annular base 41 and first and second radial attachment tabs 42, 43. The section of the ring sector may have a shape other than "π", such as a "K" or "O" shape. The annular base 41 comprises, in the direction DR of the ring 4, an inner face 41a and an outer face 41b opposite each other. The inner face 41a of the annular base 41 can be coated with a layer of abradable material 44 to define a flow duct for the gaseous flow in the turbine.

The first and second attachment tabs 42, 43 extend radially outwards from upstream 421a and downstream 421b ends respectively of each ring sector. In the example shown in FIG. 2, the first and second tabs 42, 43 project outwards (in the direction DR) from the outer face 41b and the upstream and downstream ends 421a, 421b of the annular base 41 of each ring sector 40. The first and second tabs 42, 43 extend over the entire width of the ring sector 40, i.e. over the entire arc of a circle described by the ring sector 40, or over the entire circumferential length of the ring sector 40.

As described above, the annular support 5 secured to the turbine casing 6 comprises:
a central cylindrical portion 51, extending in the direction DA, and having an axis of revolution coincident with the axis A of the turbine ring 4 when they are attached together,
a first annular flange 52 and a second annular flange 53, upstream and downstream respectively, the first and second flanges 52, 53 extending radially inwards (with respect to the direction DR) from an internal face 51 a of the portion 51.

The first flange 52 comprises a first free end 524 and a second opposite end 525 which is connected to the inner face 51a of the portion 51.

The second flange 53 comprises a first portion 531, a second portion 532, and a third portion 533 comprised between the first and second portions 531, 532. The first and third portions 531, 533 may form an inner periphery (relative to the direction DR) of the second flange 53, and the second portion 532 may form an outer periphery (relative to the direction DR) of the second flange 53. The first portion 531 comprises a first free end 534 and the second portion 532 comprises a second end 535 connected to the inner face 51a of the portion 51. The first portion 531 extends between the first end 534 and the third portion 533, and the second portion 532 extends between the third portion 533 and the second end 535. The second and the third portions 532, 533 are separated by a shoulder 537. In the example shown in FIG. 2, the inner periphery of the first portion 531 (in particular a radial annular face 536 of the first portion 531) is in contact with the second attachment tab 43 of the turbine ring 4. The first portion 531 and the third portion 533 have a greater thickness than that of the second portion 532 to provide greater a rigidity to the second flange 53 compared with the upstream part comprising in particular the first flange 52, so as to reduce the axial leakages of the ring in the case of a rectilinear abutment.

Figure 2:
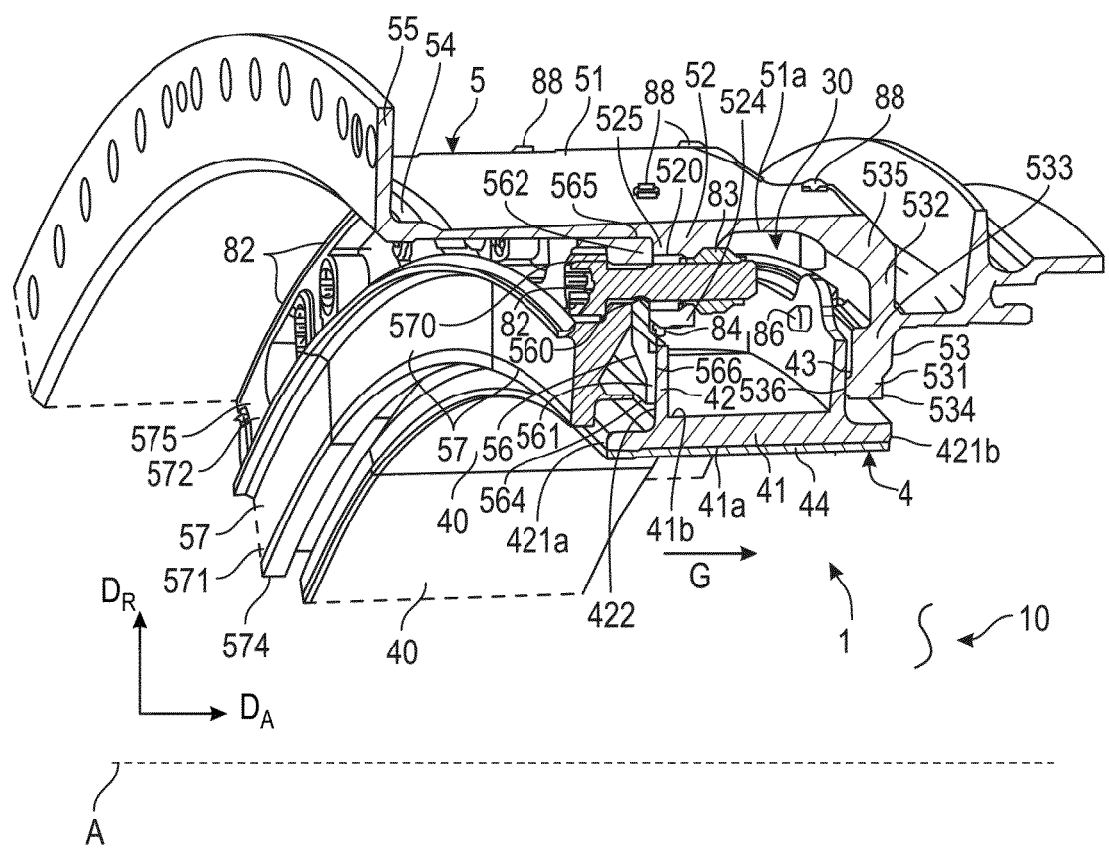
FIG. 2 is a schematic perspective view of a turbine ring assembly of the high-pressure turbine according to the prior art.

With reference to FIG. 2, in addition to a first annular shroud 56, the assembly 1 also comprises a second annular shroud 57. The two shrouds 56, 57 are removably attached to the first flange 52 of the annular support 5. The first and second shrouds 56, 57 are arranged upstream of the assembly 1 of the turbine ring with respect to the orientation G of flowing of the gaseous flow in the turbine. The first shroud 56 is arranged downstream of the second shroud 57. The first shroud 56 is in one piece, while the second shroud 57 can be sectored into a plurality of second shroud 57 annular sector or be in one piece.

The first shroud 56 has a first free end 564 and a second end 565 removably attached to the annular support 5, and more particularly to the first flange 52. In addition, the first flange 52 has a first portion forming an inner periphery 561 (relative to the direction DR) and a second portion forming an outer periphery 562 (relative to the direction DR). The inner periphery 561 extends between the first end 564 and the outer periphery 562, and the outer periphery 562 extends between the inner periphery 561 and the second end 565. When the assembly 1 of the turbine ring is mounted, the inner periphery 561 of the first shroud 56 (and in particular a radial annular face 566 of the first shroud 56) bears against the first attachment tab 42 of each of the ring sectors 40, and the outer periphery 562 bears against at least part of the first flange 52.

The second shroud 57 has a first free end 574 and a second end 575 opposite the first end 574 and in contact with the cylindrical portion 51. The second end 575 of the second shroud 57 is also removably attached to the annular support 5, and more particularly to the first flange 52. The second shroud 57 also comprises a first portion forming an inner periphery 571 and a second portion forming an outer periphery 572. The inner periphery 571 extends between the first end 574 and the outer periphery 572, and the outer periphery 572 extends between the inner periphery 571 and the second end 575.

The first and second shrouds 56, 57 are shaped so as to have the inner peripheries 561, 571 spaced apart from each other and the outer peripheries 562, 572 in contact, the two shrouds 56, 57 being removably attached to the first flange 52 by means of attachment screws 82 and nuts 83, the screws 82 passing through orifices 570, 560 and 520 provided respectively in the outer peripheries 572 and 562 of the two shrouds 56, 57 and in the first flange 52.

In order to hold the ring sectors 40, and therefore the turbine ring 4, in position with the annular support 5, the assembly 1 of the turbine ring comprises, for each ring sector 40, two first axial pins 84 (with respect to the direction DA) cooperating with the first attachment tab 42 and the first shroud 56, and two second axial pins 86 (with respect to the direction DA) cooperating with the second attachment tab 57 and the second flange 53. For each corresponding ring sector 40, the inner periphery 561 of the first shroud 56 comprises orifices for receiving the two first pins 84, and the third portion 533 of the second flange 53 comprises orifices configured to receive the two second pins 86. For each ring sector 40, each of the first and second attachment tabs 42, 43 comprises orifices configured to receive the first pins 84 and the second pins 56.

The annular support 5 also comprises radial pins 88 (in relation to the direction DR) which allow the ring 4 to be pressed in a deterministic manner in the lower radial position, i.e. towards the duct. There is clearance between the axial pins 84, 86 and the bores on the ring to compensate for the differential expansion between the metal and the CMC elements that occurs when hot. The radial pins 88 cooperate with orifices made in the cylindrical portion 51 of the annular support 5 in the direction DR.

As previously described with reference to FIG. 1, air coming from the compressor of the turbomachine is collected upstream of the combustion chamber 1a and enters (via piercings 58a, 52a) in the cooling air circulation cavity 30 of each ring sector 40. This cavity 30 therefore supplies all the ring sectors 40 with air flow F and cools them.

Each ring sector 40 of the turbine ring 4 is made of a ceramic matrix composite (CMC) material, while the first and second flanges 52, 53 of the annular support 5 and the first and second shrouds 56 are made of a metallic material. This arrangement of the assembly 1 of the turbine ring in FIG. 2 has a number of disadvantages mentioned above in the technical background, in particular the risk of generating mechanical stresses and embrittlement of the first metal shroud 56 and/or the second metal flange 53, which are exposed to the hot flow of the turbine.

The assembly 1 of the turbine ring of the present invention may also be suitable for installation in the turbomachine 10 shown in FIG. 1. FIGS. 3 to 9b show several embodiments of the assembly 1 according to the invention.

Figure 3:
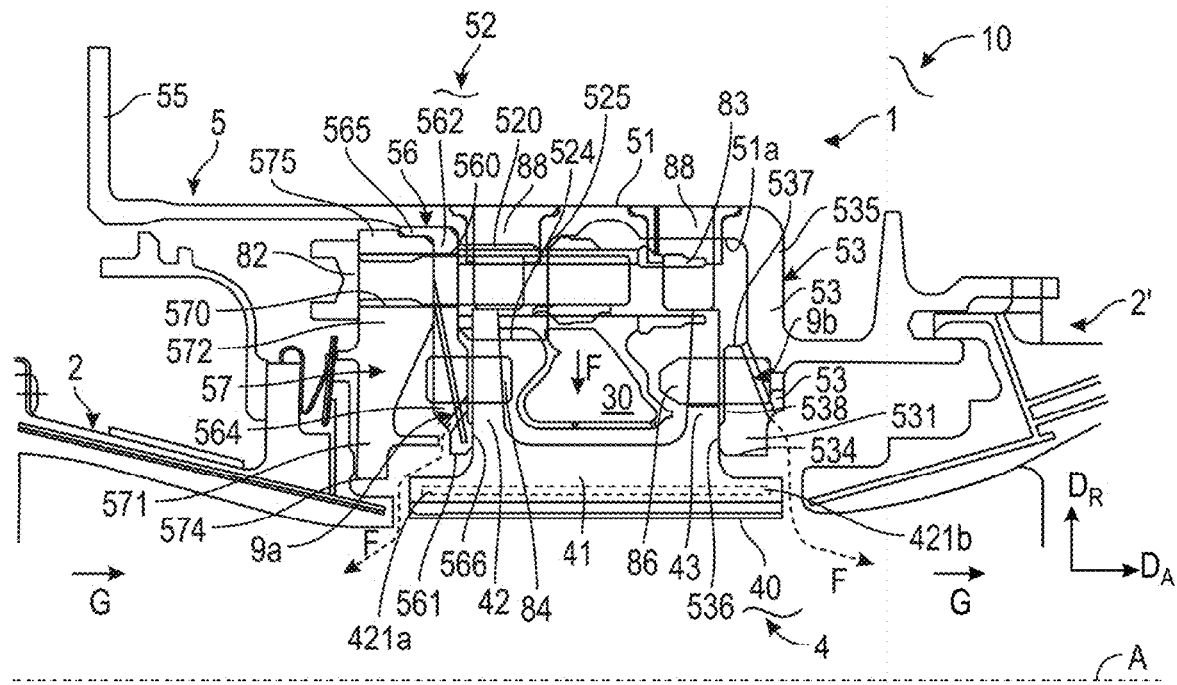
FIG. 3 is a schematic view in axial cross-section of a turbine ring assembly according to one of the embodiments of the invention.

The assembly 1 of the turbine ring according to the invention comprises the ring sectors 40 made of CMC material, the metal annular support 5 and the first and second metal shrouds 56, 57 as described above with reference to FIG. 2. The assembly 1 according to the invention can be distinguished from the assembly 1 of the turbine ring according to the prior art (FIG. 2) by the presence of air passage orifices 9a, 9b which are formed in the first shroud 56 and/or in the second flange 53 of the annular support 5. These orifices 9a, 9b allow the air flow F to pass from the cooling cavity 30 of each ring sector 40 to outside the assembly 1 of the turbine ring (FIG. 3). This arrangement of the assembly 1 according to the invention therefore allows to cool the first shroud 56 and/or the second flange 52 with a minimum flow rate of air flow (coming from the cavity 30); and/or to prevent a reintroduction of duct gases towards the first and second attachment tabs 42, 43.

More specifically, FIGS. 3 to 6b illustrate a first embodiment of the assembly 1 of the turbine ring according to the invention.

In FIG. 3, air passage orifices 9a are formed in the first shroud 56 and air passage orifices 9b are formed in the second flange 53. In a first variant (not illustrated), the orifices 9a can be formed only in the first shroud 56. In a second variant (not shown), the orifices 9b can be formed only in the second flange 53.

In particular, the orifices 9a are formed in the inner periphery 561 of the first shroud 56. The orifices 9a can be oriented in a circumferential direction of the ring assembly (relative to the axis A). In the example shown in FIG. 3, these orifices 9a are oriented, from upstream to downstream, radially outwards (with respect to the axis A or the direction DA). The orifices 9a open in particular downstream and radially outside the radial annular face 566 for abutting on the first attachment tab 42. This allows to direct the air flow F from the cavity 30 towards the turbine stator 2 upstream of the ring sector 40.

The orifices 9b in the second flange 53 are preferably formed in the third portion 533 of the second flange 53. The orifices 9b can be oriented in a circumferential direction of the ring assembly (relative to the axis A). In the example shown in FIG. 3, these orifices 9b are oriented, from upstream to downstream, radially inwards (with respect to the axis A or the direction DR). The orifices 9b open in particular downstream and radially outside the radial annular face 536 for abutting on the second attachment tab 43. This also allows the air flow F to be directed from the cavity 30 towards the turbine stator 2 downstream of the ring sector 40. In the example, the orifices 9b open upstream and into the shoulder 537 of the second flange 53. Alternatively (not illustrated), the orifices 9b may open upstream and into a radial annular face 538 of the third portion 533, this face 538 not in abutment on the second attachment tab 43 of the turbine ring 4.

Figure 4:
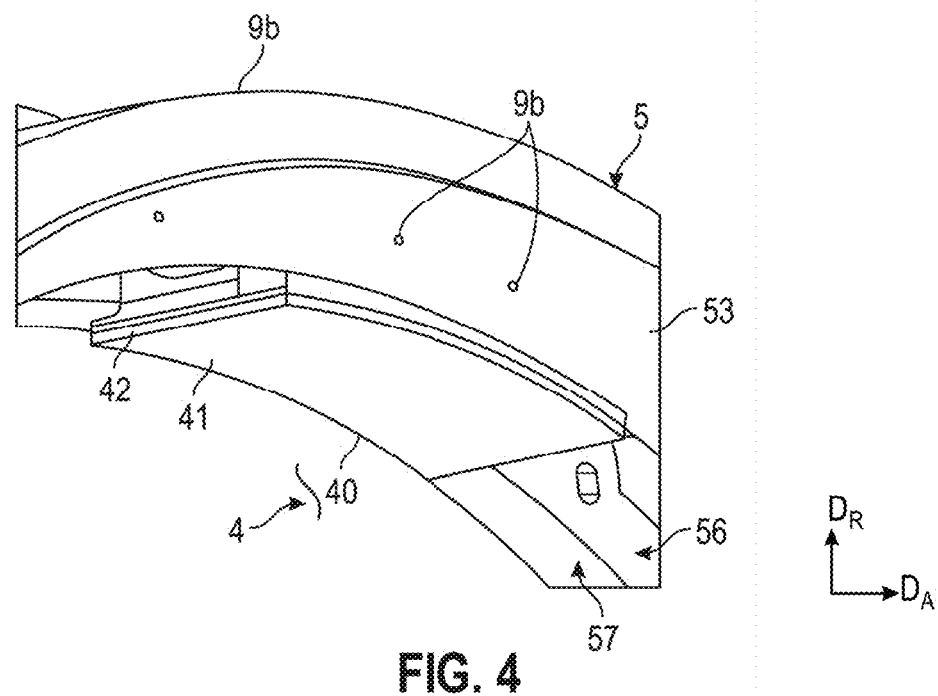
FIG. 4 is a partial schematic perspective view of the ring assembly of FIG. 3 according to a first embodiment, in which a second downstream flange of an annular support comprises air passage orifices according to a first configuration.
Figure 5A:
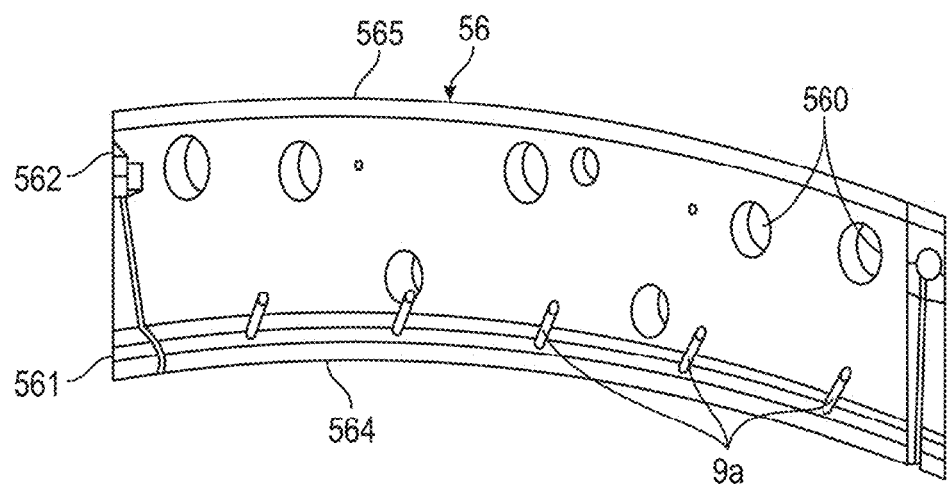
FIG. 5a is a schematic perspective view of the upstream side of a first shroud of the ring assembly of FIG. 3 or 4 comprising orifices according to the first configuration.
Figure 5B:
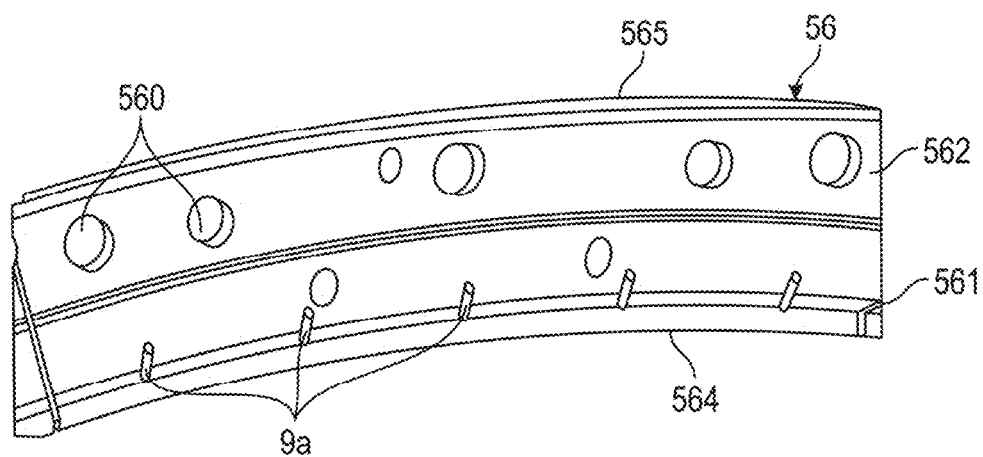
FIG. 5b is a schematic perspective view of the downstream side of the first shroud in FIG. 5b.
Figure 6A:
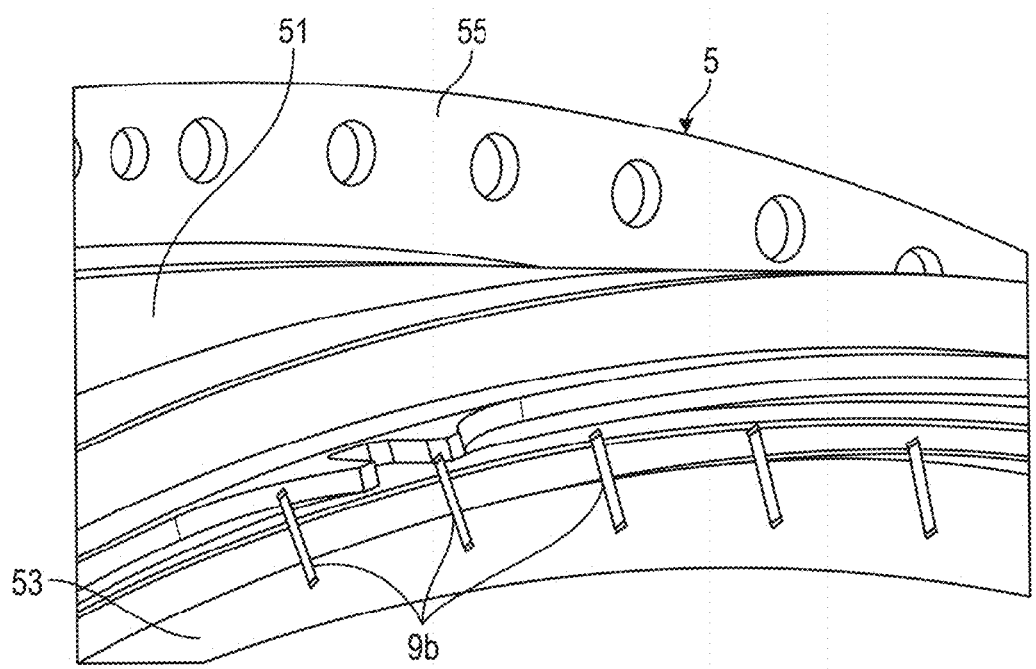
FIG. 6a is a schematic perspective view of the downstream side of the second downstream flange in FIG. 4, which comprises orifices in the first configuration.
Figure 6B:
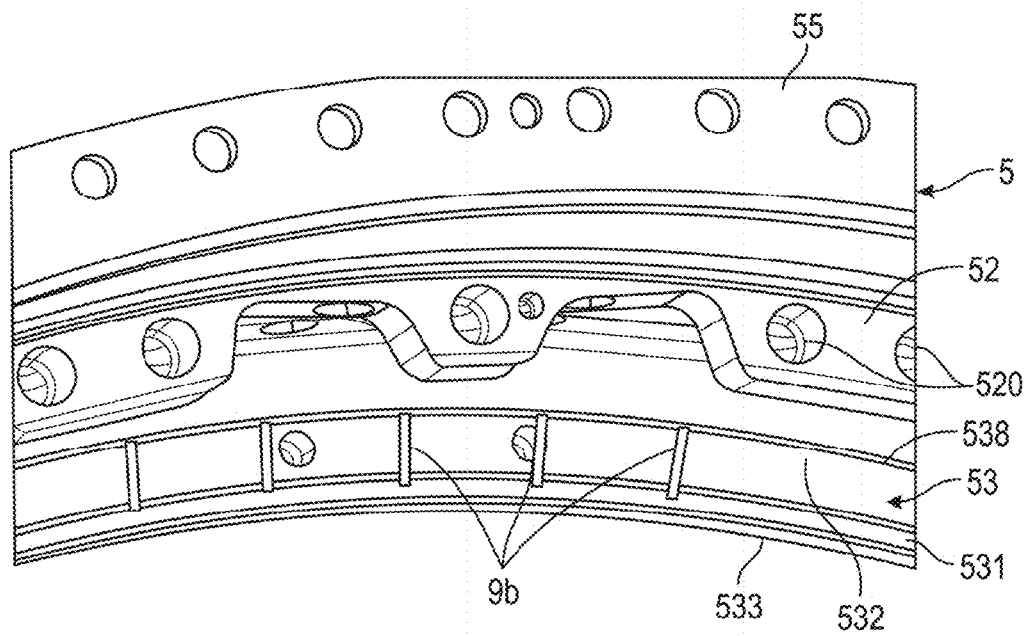

According to this first embodiment, the orifices 9a formed in the first shroud 56 are evenly spaced around the axis A, as illustrated in FIGS. 5a and 5b. The orifices 9b formed in the second flange 53 are also evenly spaced around the axis A, as shown in FIGS. 4, 6a and 6b.

The orifices 9a, 9b may be circular and/or oblong.

The orifices 9a, 9b can be three to ten for each ring sector 40. In the examples shown in FIGS. 5a to 6b, there are five orifices 9a, 9b per ring sector 40.

FIGS. 7a to 9b illustrate a second embodiment of the assembly 1 of the turbine ring according to the invention.

The assembly 1 of the turbine ring of the second embodiment is distinguished from the assembly 1 of the turbine ring of the first embodiment by the arrangement of the air passage orifices in the first shroud 56 and/or the second flange 53 of the annular support 5.

Figure 7A:
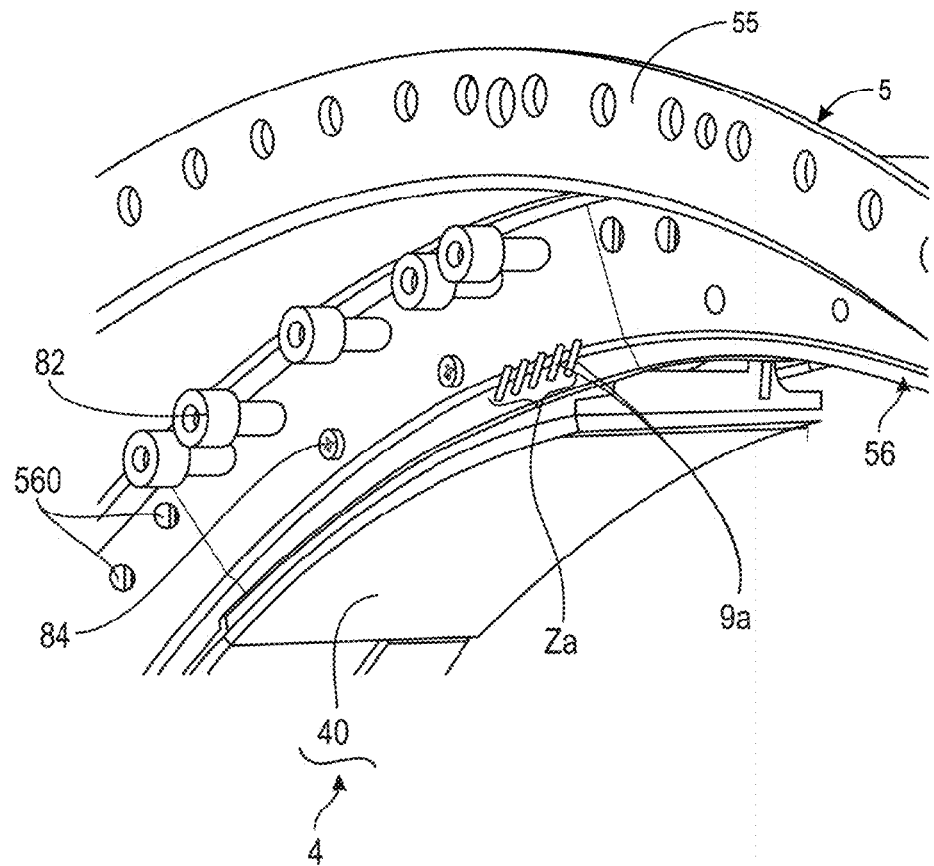
FIG. 7a is a schematic partial perspective view of the upstream side of a ring assembly, in which a first shroud comprises air passage orifices in a second configuration.
Figure 7B:
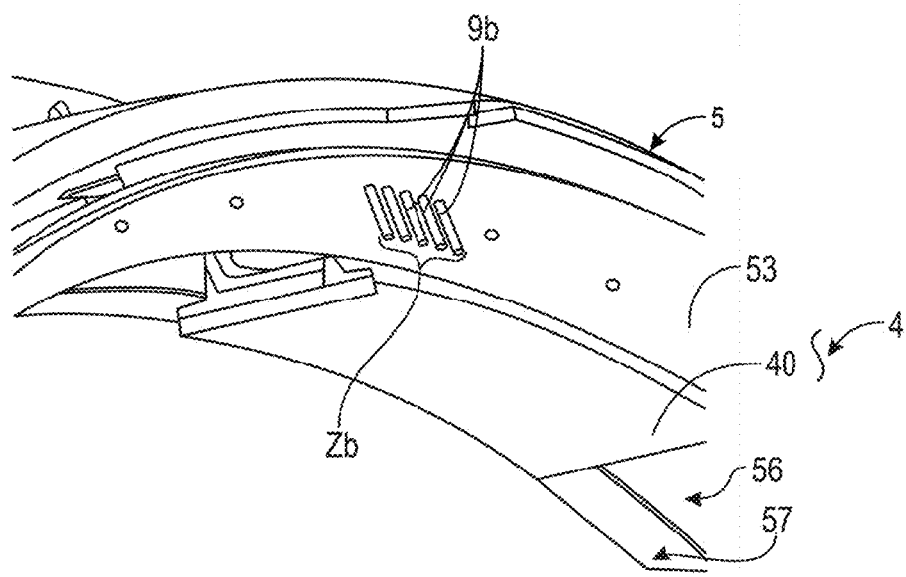
FIG. 7b is a partial schematic perspective view of the downstream side of the ring assembly of FIG. 7a, in which a second downstream flange comprises air passage orifices according to the second configuration.
Figure 8A:
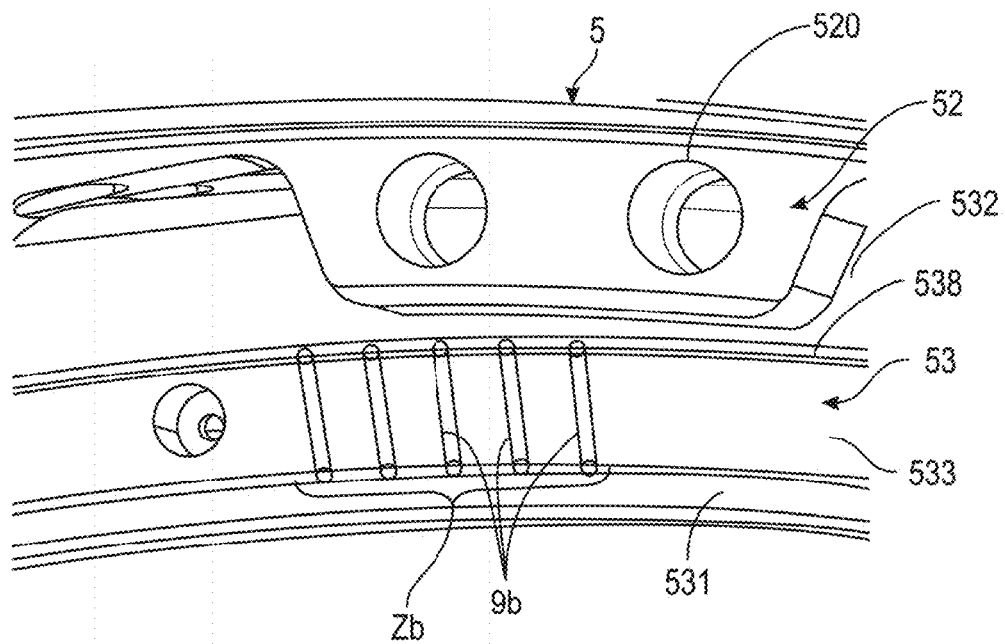
FIG. 8a is a schematic perspective view of the upstream side of the second downstream flange of FIG. 7b.
Figure 8B:
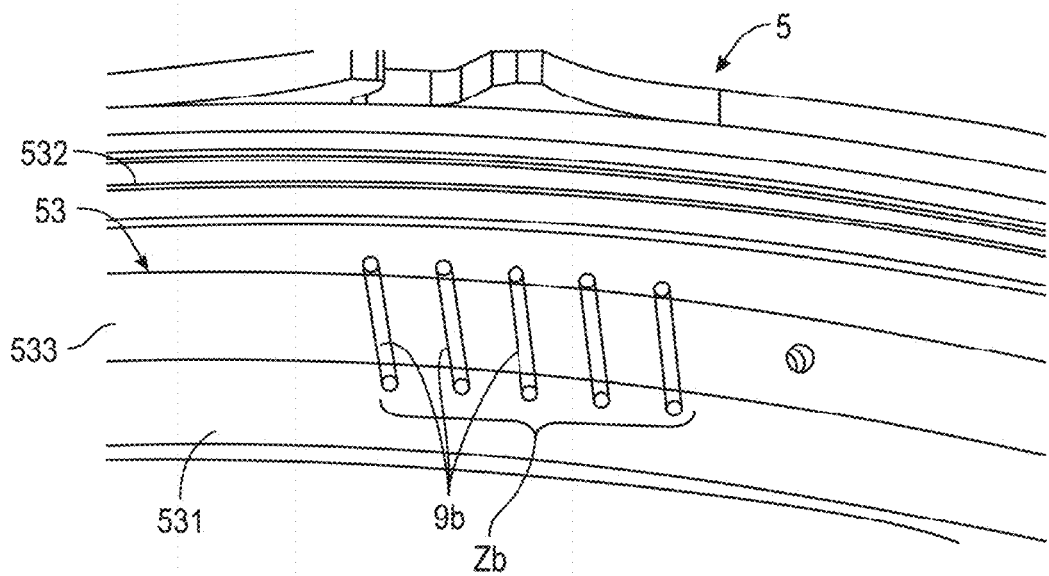
Figure 9A:
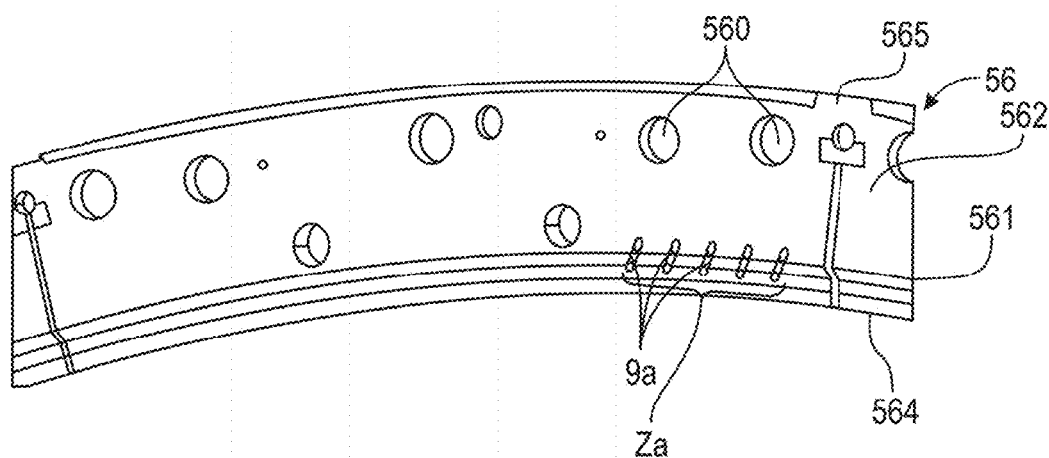
Figure 9B:
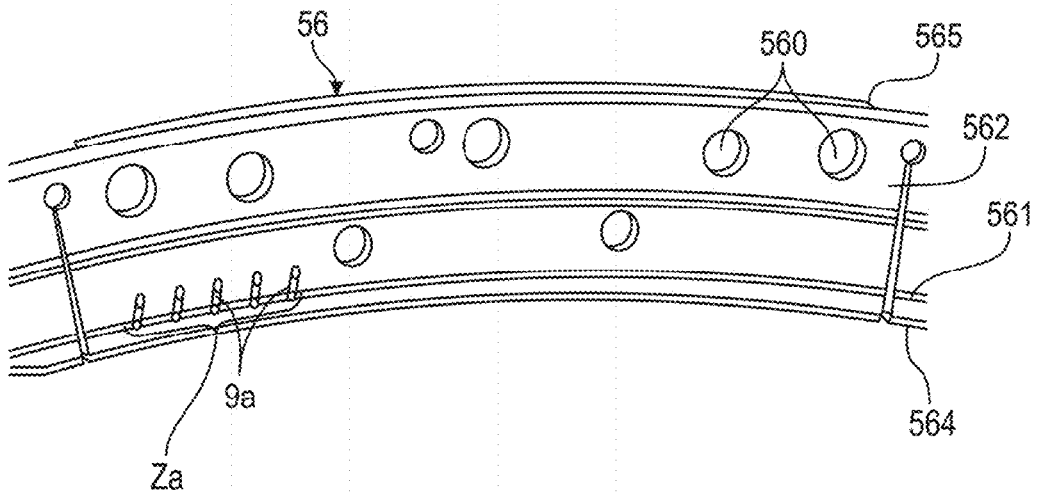

According to the second embodiment, the air passage orifices 9a, 9b are grouped together in series of orifices per ring sector 40. Each series of orifices 9a can be formed on the first shroud 56, as shown in FIGS. 7a, 9a and 9b; and/or each series of orifices 9b can be formed on the second flange 53, as shown in FIGS. 7b, 8a and 8b. In particular, the circumferential pitch around the axis A between the orifices 9a, 9b of the same series of orifices 9a, 9b is less than the circumferential pitch around the axis A between two consecutive series of orifices 9a, 9b. Circumferential pitch means the distance measured circumferentially in relation to the axis A between two consecutive orifices or two consecutive series of orifices with similar profiles.

In the example shown in FIGS. 7a and 7b, each series of orifices 9a is located on the first shroud 56, in particular on a first predetermined area Za of the first shroud 56.

FIG. 7b illustrates a series of orifices 9b located on the second flange 53, in particular on a second predetermined area Zb of the second flange 53. The position of each series of orifices 9a, 9b in the predetermined areas Za, Zb may be constant or variable depending on the dimensions of the turbine ring 4 and of the annular support 5. Preferably, each series of orifices 9a, 9b are located in areas Za, Zb where the static pressure is highest in the flowing duct of the gaseous flow G.

Each series of orifices 9a, 9b may comprise between three and ten orifices. In the examples shown, each series of orifices 9a, 9b comprises five orifices 9b.

The present invention also relates to a turbine, in particular an HP turbine 1b, comprising at least one turbine stator 2, 2' formed by an annular row of stationary vanes 20, 20' and an impeller 3. The impeller 3 is rotatably mounted downstream of the turbine stator 2 and inside the turbine ring 4 of the assembly 1 of the turbine ring according to the invention.

When the turbomachine 10 comprises a single annular row of stationary vanes (FIG. 1), the vanes 20 upstream of the ring sector 40 are formed on the HP turbine stator 2 and the vanes 20' downstream of the ring sector 40 are formed on the LP turbine stator 2'. Alternatively, the vanes 20' downstream of the ring sector 40 are formed on the LP turbine stator 2' and/or on the HP turbine stator 2 when the turbomachine 10 comprises several HP turbine stators. By way of example (not illustrated), first series of orifices 9a formed on the first shroud 56 are located between trailing edges 22 of two consecutive vanes 20 upstream of the ring sector 40 and corresponding to the first area Za. Second series of orifices 9b formed on the second flange 53 are located between leading edges 21 of two consecutive vanes 20' downstream of the ring sector 40 and corresponding to the second area Zb. This assembly 1 of the turbine ring allows to obtain a specific tangential positioning of the orifices 9a, 9b with respect to the positioning of the vanes 20, 20' upstream and downstream of the ring sectors 40. This arrangement allows to limit the reintroduction of the duct gases towards the assembly 1 of the turbine ring (and in particular towards the first metal shroud 56, the second metal flange 53 of the annular support 5 and also the first and second attachment tabs 42, 43). This is because the gas flow G passing between the trailing edges or between the leading edges of two consecutive vanes is less disturbed (with little or no vortex) and therefore comprises a higher static pressure than the gas flow G passing between the leading edge and the trailing edge of the same vane. Placing orifices 9a, 9b in the path of the undisturbed gas flow therefore allows the air flow F to be evacuated quickly and unhindered from the assembly 1, while cooling the first shroud 56 and/or the second flange 53.

The present invention also relates to a turbomachine 10, in particular for an aircraft, comprising at least one assembly 1 of the turbine ring according to the invention. The turbomachine may be a turbojet or a turboprop.

The invention claimed is:

1. An assembly of a turbine ring for a turbomachine of an aircraft, the assembly extending about an axis and comprising:
    ring sectors made of ceramic matrix composite material forming a turbine ring, each ring sector comprising first and second attachment tabs extending radially outwards from upstream and downstream ends respectively of the ring sectors, the first and second tabs defining between them a cavity for circulating a flow of cooling air;
    an annular metal support for the turbine ring having first and second annular flanges, upstream and downstream respectively, extending radially inwards and configured to hold the first and second attachment tabs of each ring sector, the second flange in axial abutment toward upstream against the second attachment tab, with respect to the orientation of gas flow intended to pass through the assembly along the axis;
    a first annular metal shroud arranged upstream of the turbine ring and of the first flange, the first shroud having an inner periphery in axial abutment toward downstream against the first attachment tab and an outer periphery attached to the first flange; and
    air passage orifices formed in the inner periphery of the first shroud and/or in the second flange, the air passage orifices configured to provide an air outlet from the cavity,
    wherein the air passage orifices are grouped together to form a series of orifices, the circumferential pitch about the axis between the orifices of the same series of orifices being less than the circumferential pitch about the axis between two consecutive series of orifices.

2. The assembly according to claim 1, wherein the orifices of the first shroud are oriented from upstream to downstream radially outwards, and/or the orifices of the second flange are oriented from upstream to downstream radially inwards, the orifices being oriented in a circumferential direction.

3. The assembly according to claim 1, wherein the inner periphery of the first shroud comprises a radial annular face for abutting on the first attachment tab, and wherein the orifices formed on the first shroud open downstream radially to the outside of the face.

4. The assembly according to claim 1, wherein the second flange comprises an inner periphery having a radial annular face for abutting on the second attachment tab, and wherein the orifices formed on the second flange open upstream radially to the outside of the face.

5. The assembly according to claim 1, wherein the air passage orifices are regularly spaced around the axis.

6. The assembly according to claim 1, wherein each series of orifices comprises between three and ten orifices.

7. The assembly according to claim 1, wherein the orifices are circular and/or oblong in shape.

8. The assembly according to claim 1, wherein the air passage orifices are formed in the first shroud and in the second flange.

9. The assembly according to claim 1, wherein the second flange comprises a first portion, a second portion, and a third portion comprised between the first and second portions, the second and third portions being separated by a shoulder, wherein the orifices formed on the second flange open upstream and into the shoulder.

10. The turbomachine comprising the assembly of the turbine ring according to claim 1.

11. A turbine for the turbomachine of an aircraft, comprising at least one turbine stator formed by an annular row of stationary straightening vanes and an impeller mounted to rotate downstream of the turbine stator and inside the assembly of the turbine ring according to claim 1.

12. The turbine according to claim 11, wherein each series of orifices formed on the first shroud is located between two trailing edges of two consecutive stationary vanes upstream of the turbine ring, and/or each series of orifices formed on the second flange of the annular support is located between two leading edges of two consecutive stationary vanes downstream of the turbine ring.

* * * * *